United States Patent
Ido et al.

(10) Patent No.: US 10,362,261 B2
(45) Date of Patent: Jul. 23, 2019

(54) MEMORY CARD HAVING A WIRELESS FUNCTION FOR LINKING LOCATION INFORMATION TO IMAGE DATA

(71) Applicant: Toshiba Memory Corporation, Tokyo (JP)

(72) Inventors: Michio Ido, Yokohama Kanagawa (JP); Keisuke Sato, Yokohama Kanagawa (JP); Shigeto Endo, Kamakura Kanagawa (JP); Mai Ando, Yokohama Kanagawa (JP); Shuichi Sakurai, Yokohama Kanagawa (JP); Masaomi Teranishi, Yokohama Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 15/448,565

(22) Filed: Mar. 2, 2017

(65) Prior Publication Data
US 2018/0255267 A1    Sep. 6, 2018

(51) Int. Cl.
| | |
|---|---|
| H04N 5/76 | (2006.01) |
| H04N 5/77 | (2006.01) |
| H04N 5/907 | (2006.01) |
| G06F 3/06 | (2006.01) |
| G06F 16/51 | (2019.01) |

(Continued)

(52) U.S. Cl.
CPC ............... *H04N 5/77* (2013.01); *G06F 16/51* (2019.01); *H04N 5/907* (2013.01); *H04N 9/8205* (2013.01)

(58) Field of Classification Search
CPC .. H04N 1/64; H04N 5/76; H04N 5/77; H04N 5/8205; H04N 5/765; H04N 21/478; H04N 5/907; G06F 3/0604; G06F 3/0643; G06F 17/3028; G06F 3/0484; G06F 16/51; G01S 19/00–55; H03W 4/185
USPC ....... 348/231.2, 231.99–231.9, 222.1, 207.8, 348/231.1–231.9, 207.99; 715/738, 255; 725/89, 92, 134, 145
See application file for complete search history.

(56) References Cited

U.S. PATENT DOCUMENTS

| | | | |
|---|---|---|---|
| 8,773,474 B2 * | 7/2014 | Takakura | ................ G09G 5/00 345/681 |
| 9,438,847 B2 | 9/2016 | Hara | |

(Continued)

FOREIGN PATENT DOCUMENTS

| | | |
|---|---|---|
| JP | 2007-020054 A | 1/2007 |
| JP | 2011-077727 A | 4/2011 |

*Primary Examiner* — Marly S Camargo
(74) *Attorney, Agent, or Firm* — Kim & Stewart LLP

(57) ABSTRACT

A method of linking location information to image data in a storage device includes: generating image files, each including image data of a captured image and a time stamp of when the image was captured; determining an first time stamp and a second time stamp within a group of the image files; wirelessly transmitting the first time stamp and the second time stamp to a device having a location logging function and, in response to the wirelessly transmitting, receiving location information corresponding to at least one of a plurality of time stamps including the first time stamp, the second time stamp, and a third time stamp that is between the first time stamp and the second time stamp; and embedding location information in each image file based on the time stamp included therein and the location information received from the device.

12 Claims, 14 Drawing Sheets

(51) Int. Cl.
*G01S 19/00* (2010.01)
*H04N 9/82* (2006.01)

(56) References Cited

U.S. PATENT DOCUMENTS

| | | | | |
|---|---|---|---|---|
| 2001/0016849 A1* | 8/2001 | Squibbs | ............... | G06F 17/30 707/104.1 |
| 2011/0169982 A1* | 7/2011 | Yamakawa | ............ | H04N 5/76 348/231.2 |
| 2014/0009640 A1* | 1/2014 | Keesy | ................. | H04N 5/765 348/231.4 |
| 2016/0172007 A1* | 6/2016 | Bando | ................... | H04N 9/80 348/231.5 |

* cited by examiner

*FIG.4*

GPS LOG INFORMATION STORED IN SECOND HOST APPARATUS (e.g. SMART PHONE)

| Date and Time | Location |
|---|---|
| at 18:15:00 on August 8th, 2016 | A |
| at 18:20:00 on August 8th, 2016 | B |
| at 18:25:00 on August 8th, 2016 | C |
| at 18:30:00 on August 8th, 2016 | D |
| at 18:35:00 on August 8th, 2016 | E |
| ... | ... |

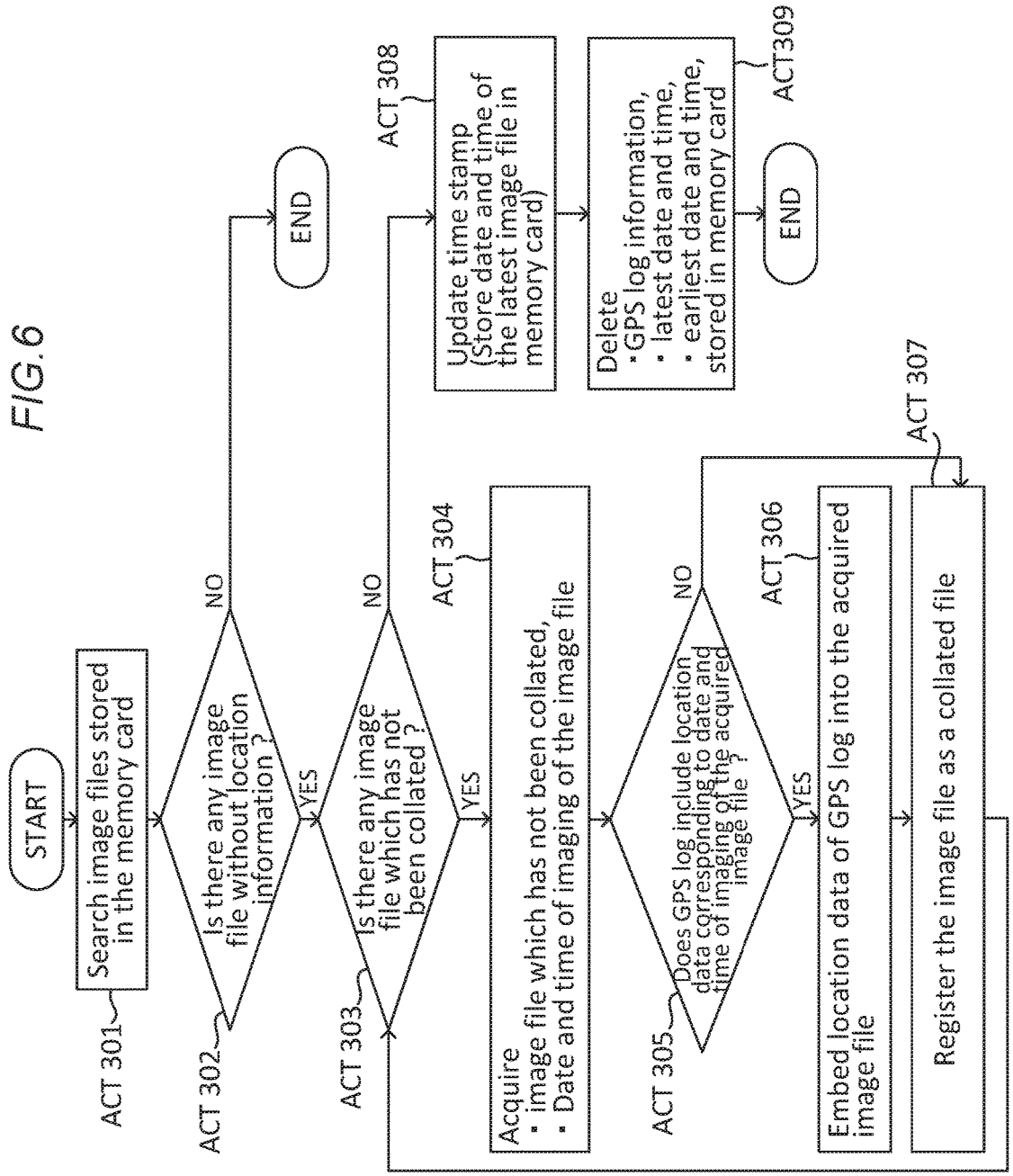

FIG. 8

IMAGE FILE MANAGEMENT INFORMATION
STORED IN WIRELESS MEMORY CARD

| Image file ID | Date and Time | Location |
|---|---|---|
| 1 | at 18:15:20 on August 8th, 2016 | Blank |
| 2 | at 18:25:20 on August 8th, 2016 | Blank |
| 3 | at 18:25:30 on August 8th, 2016 | Blank |
| 4 | at 18:30:10 on August 8th, 2016 | Blank |
| 5 | at 18:31:00 on August 8th, 2016 | Blank |
| ... | ... | ... |

FIG. 11

GPS LOG INFORMATION STORED IN SECOND HOST APPARATUS (e.g. SMART PHONE)

| Date and Time | Location |
|---|---|
| at 18:15:00 on August 8th, 2016 | A |
| at 18:20:00 on August 8th, 2016 | B |
| at 18:25:00 on August 8th, 2016 | C |
| at 18:30:00 on August 8th, 2016 | D |
| at 18:35:00 on August 8th, 2016 | E |
| ... | |

IMAGE FILE MANAGEMENT INFORMATION STORED IN WIRELESS MEMORY CARD

| Image file ID | Date and Time | Location |
|---|---|---|
| 1 | at 18:15:20 on August 8th, 2016 | A |
| 2 | at 18:25:20 on August 8th, 2016 | C |
| 3 | at 18:25:30 on August 8th, 2016 | C |
| 4 | at 18:30:10 on August 8th, 2016 | D |
| 5 | at 18:31:00 on August 8th, 2016 | D |
| ... | ... | |

MEMORY CARD HAVING A WIRELESS FUNCTION FOR LINKING LOCATION INFORMATION TO IMAGE DATA

BACKGROUND

Devices that can capture images and have GPS logging functions are known. A smart phone is one example of such devices. These devices generally can associate image data of a captured image with location information obtained using the GPS logging functions at the time of the imaging, and store them together in a storage device, as an image file. By associating the image data with the location information, users can manage the image files based on location information.

In the case of the devices that do not have GPS logging functions, e.g., cameras, the user needs to manually obtain and associate location information with the image data, in order to manage image files based on location information. For example, the user can associate location information with the image data using a personal computer, but doing so is burdensome for the user. As a result, image files generated by devices that do not have GPS logging functions often do not have location information associated therewith.

DESCRIPTION OF THE DRAWINGS

FIG. 4 is a table showing GPS log information.

FIG. 6 depicts a flow chart of a detailed operation of steps in FIGS. 3A and 3B.

FIG. 8 is a table showing the image file management information without the location information stored in the wireless communication memory.

FIG. 11 is a diagram depicting an associating process between the image file without the location information and the GPS log information according to the second embodiment.

DETAILED DESCRIPTION

A method of linking location information to image data in a storage device, according an embodiment, includes: generating image files, each including image data of a captured image and a time stamp of when the image was captured, determining a first time stamp and a second time stamp within a group of the image files, wirelessly transmitting the first time stamp and the second time stamp to a device having a location logging function, in response to the wirelessly transmitting, receiving location information corresponding to at least one of a plurality of time stamps including the first time stamp, the second time stamp, and a third time stamp that is between the first time stamp and the second time stamp; and embedding location information in each image file based on the time stamp included therein and the location information received from the device.

A wireless storage device according to another embodiment includes a first nonvolatile memory in which a group of image files, each including image data of a captured image and a time stamp of when the image was captured, are stored, a second nonvolatile memory in which an first time stamp and a second time stamp of the image files in the group are stored, a controller. The controller transmits the first time stamp and the second time stamp to a host device having a location logging function, and upon receipt of location information corresponding to at least one of a plurality of time stamps including the first time stamp, the second time stamp, and a third time stamp that is between the first time stamp and the second time stamp, embeds location information in each image file based on the time stamp included therein and the location information received from the device.

A wireless storage device according to another embodiment includes a first nonvolatile memory in which a group of image files, each including image data of a captured image and a time stamp of when the image was captured, are stored, a second nonvolatile memory in which a table having a plurality of entries are stored, wherein each entry is for a respective one of the image files and includes an image ID of the respective image file and a time stamp of the respective image file, and a controller configured to transmit the table to a host device having a location logging function, receive from the host device, in response thereto, the table in which location information has been filled in for each of the entries of the table, and embed location information in each image file based on the location information associated with the image file in the table.

A method of linking location information to image data according to a first embodiment is explained with reference to FIGS. 1 to 6.

Figure 1:
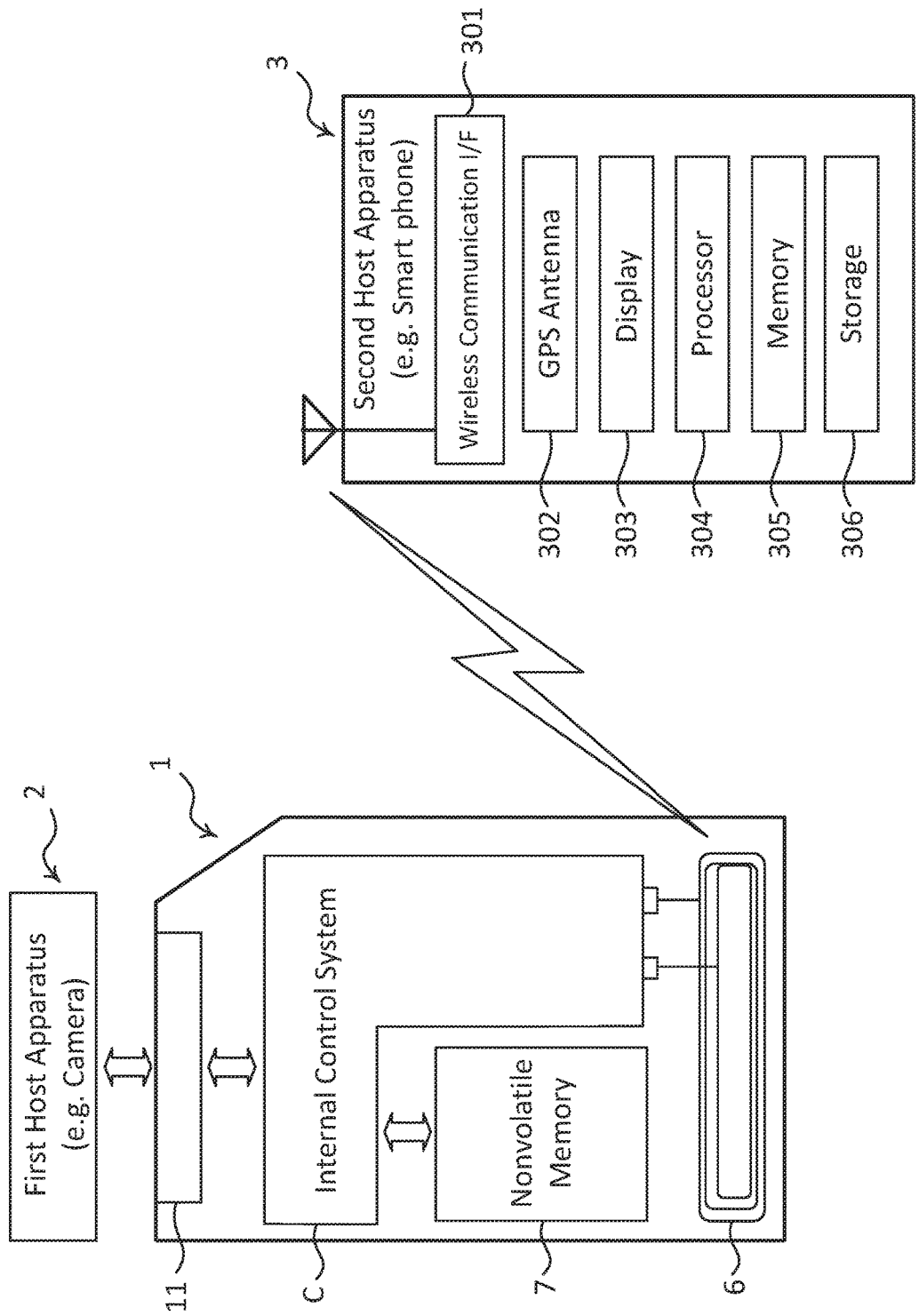
FIG. 1 is a diagram depicting a configuration of a system in which a memory card according to a first embodiment obtains and associates location information to image data.
Figure 2:
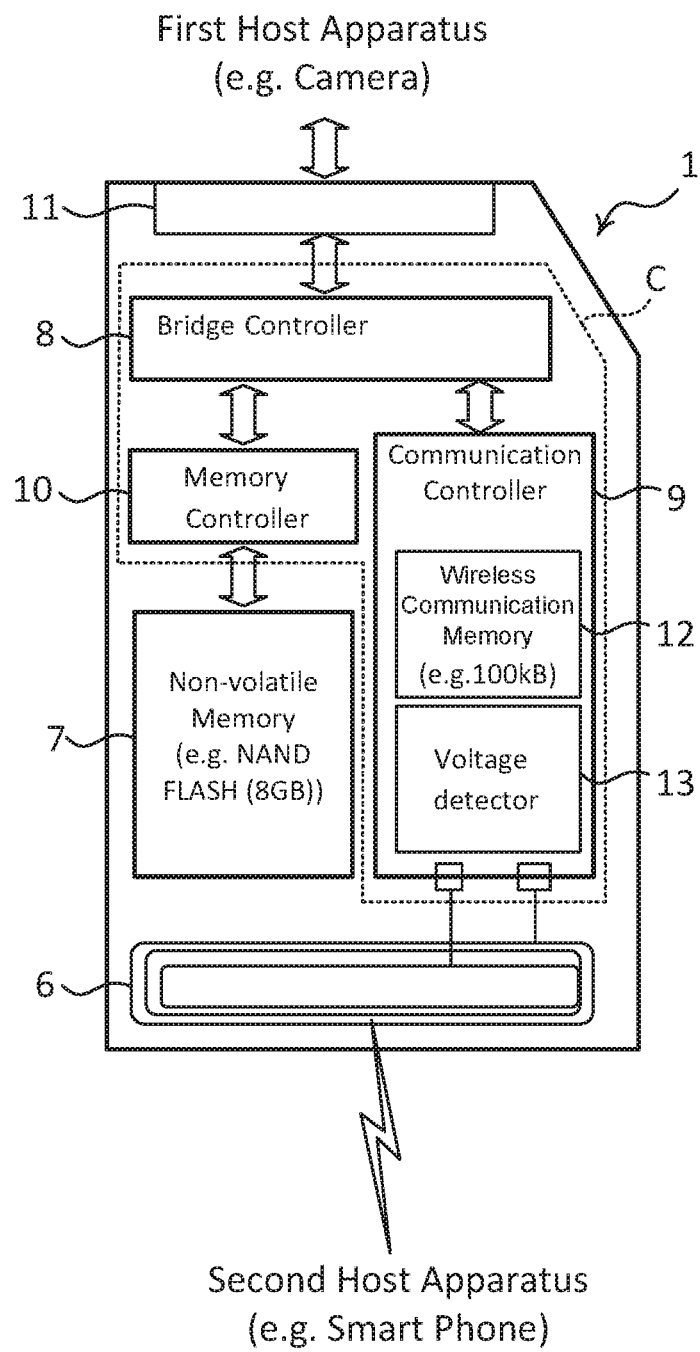
FIG. 2 is a block diagram illustrating components of the memory card according to the first embodiment.

FIG. 1 is a diagram depicting a configuration of a system in which a memory card according to a first embodiment obtains and associates location information to image data. FIG. 2 is a block diagram illustrating components of the memory card according to the first embodiment.

The system of FIG. 1 includes a memory card 1 that is configured for wireless communication as described below (hereinafter referred to as "wireless memory card"), a first host apparatus 2 and a second host apparatus 3.

The wireless memory card 1 is depicted in the embodiments illustrated herein, but more generally, it may be any of storage devices that is configured for wireless communication in the manner described below.

The first host apparatus 2 is an imaging apparatus, such as a camera or a video camera. The first host apparatus 2 includes a slot into which a user can insert the wireless memory card 1. The first host apparatus 2 becomes electrically connected to the wireless memory card 1 when inserted into the slot, and transmits image files of images taken by the first host apparatus 2 to the wireless memory card 1.

The second host apparatus 3 is an information processing apparatus, such as a smart phone, that has a wireless communication function and a GPS logging function. In the first embodiment, the second host apparatus 3 can transmit and receive data, signals, information, commands, instructions, and the like to and from the wireless memory card 1.

In the first embodiment, near field communication (NFC), which is a short-range wireless communication standard with a frequency of, for example, 13.56 MHz or the like, is used for the wireless communication between the wireless memory card 1 and the second host apparatus 3.

The wireless memory card 1 has a function of storing and reading data in response to commands from the first host apparatus 2 using power supplied by the first host apparatus 2 and a function of wireless data communication with the second host apparatus 3 using power generated (induced) by electromagnetic induction of an antenna 6 when wireless signals are received by the antenna 6 in the form of radio waves. Using such power, the wireless memory card 1 can perform wireless communication to transmit or receive data to and from the second host apparatus 3.

In the present embodiment, the wireless memory card 1 is configured with a secure digital (SD) interface for communicating with the first host apparatus 2 (but a different interface may be used), and with an NFC interface for wirelessly communicating with the second host apparatus 3 (but a different wireless communication interface may be used).

The wireless memory card 1 includes the antenna 6, a nonvolatile memory 7, a bridge controller 8, a communication controller 9, a memory controller 10, and a connection unit 11. The bridge controller 8, the communication controller 9 and the memory controller 10 make up an internal control system C.

The communication controller 9 includes a wireless communication memory 12 and a voltage detector 13. The communication controller 9 and the wireless communication memory 12 are shown as being integrated, e.g., on a single chip or logic device, but may be provided separately from each other. The bridge controller 8, the communication controller 9, and the memory controller 10 can be integrated on a single chip or logic device, or provided separately.

The bridge controller 8, the memory controller 10, and the nonvolatile memory 7 operate when the wireless memory card 1 receives power from the first host apparatus 2. When the wireless memory card 1 receives power through only the antenna 6, the bridge controller 8, the memory controller 10, and the nonvolatile memory 7 does not typically operate (unless the induced power is high enough for operation of the bridge controller 8, the memory controller 10, and the nonvolatile memory 7). On the other hand, the communication controller 9, including the wireless communication memory 12 and the voltage detector 13, can operate even when the wireless memory card 1 receives power through only the antenna 6. That is, when the antenna 6 receives wireless signals with a predetermined frequency corresponding to the NFC, the communication controller 9 can operate and the wireless memory card 1 can communicate by the NFC.

The nonvolatile memory 7 may be, for example, a nonvolatile semiconductor memory. The nonvolatile memory 7 is, for example, a NAND flash memory, but may be another nonvolatile semiconductor memory such as an NOR flash memory, a magnetoresistive random access memory (MRAM), a phase change random access memory (PRAM), a resistive random access memory (ReRAM), or a ferroelectric random access memory (FeRAM). The nonvolatile memory 7 operates, for example, when the first host apparatus 2 supplies power to the wireless memory card 1.

The bridge controller 8 communicates with the first host apparatus 2, the memory controller 10, and the communication controller 9 in the manner described below. In the embodiments illustrated herein, the bridge controller 8 operates according to instructions stored in firmware.

In response to a write command received from the first host apparatus 2, the bridge controller 8 instructs the memory controller 10 to write data, such as image file, which is received together with the write command in the nonvolatile memory 7. Prior to storage in the nonvolatile memory 7, the bridge controller 8 may compress the write data using the wireless communication memory 12 as a temporary working space. The bridge controller 8 performs the compression using, for example, Huffman coding.

In response to a read command from the first host apparatus 2, the bridge controller 8 instructs the memory controller 10 to read data stored in the nonvolatile memory 7, decompresses the read data using the wireless communication memory 12 as a temporary working space, and outputs the decompressed data to the first host apparatus 2 as read data. In the embodiments illustrated herein, the function for compressing and decompressing data is implemented in the bridge controller 8. Alternatively, the compressor circuit or logic device and a decompressor circuit or logic device may be provided separately from the bridge controller 8.

The memory controller 10 controls the nonvolatile memory 7. For example, the memory controller 10 stores data in and reads data from the nonvolatile memory 7 based on instructions from the bridge controller 8. In alternative embodiments, the memory controller 10 may communicate with the communication controller 9 or the first host apparatus 2 directly without passing though the bridge controller 8.

The antenna 6 is, for example, a PCB pattern antenna. In the embodiments where NFC is employed for wireless communication, the frequency band in which the antenna 6 is configured to operate is a predetermined frequency band corresponding to the NFC. The antenna 6 generates power by electromagnetic induction based on radio waves received at the wireless antenna 6 from the second host apparatus 3. The antenna 6 supplies the generated power to the communication controller 9.

The communication controller 9 performs wireless communication with the second host apparatus 3 via the antenna 6. The communication controller 9 also performs communication with the bridge controller 8. For example, when the antenna 6 receives a read command in the form radio waves from the second host apparatus 3, the bridge controller 8 receives the read command through the communication controller 9. Based on the read command, the bridge controller 8 instructs the memory controller 10 to read data stored in the nonvolatile memory 7, decompresses the read data using the wireless communication memory 12, and outputs the decompressed data to the second host apparatus 3 as read data.

On the other hand, when the antenna 6 receives a write command with data to be stored in the nonvolatile memory 7 in the form of radio waves from the second host apparatus 3, the bridge controller 8 receives the write command and the data through the communication controller 9. Based on the write command, the bridge controller 8 instructs the memory controller 10 to store the data in the nonvolatile memory 7.

Similarly, when the antenna 6 receives a write command with data to be stored in the wireless communication memory 12 in the form radio waves from the second host apparatus 3, the communication controller 9 receives the write command and the data through the antenna 6. Based on the write command, the communication controller 9 stores the data in the wireless communication memory 12.

The wireless communication memory 12 is, for example, a nonvolatile memory, such as NOR flash memory. Although NAND flash memory may be used, NOR flash memory is preferable because it consumes less power than NAND flash memory.

The voltage detector 13 is electrically connected to the antenna 6. The voltage detector 13 detects a voltage induced at the antenna 6 and supplied to the communication controller 9. The voltage detector 13 outputs a reset command until the voltage reaches a predetermined voltage at which the communication controller 9 can operate. The communication controller 9 does not perform NFC communication while the reset command is received. The reset command can prevent an abnormal activation or operation of the NFC communication. When the voltage reaches the predetermined voltage, the voltage detector 13 outputs an operation enable command to the communication controller 9. In response thereto, the communication controller 9 can begin performing NFC communication.

The connection unit 11 is, for example, a standardized connection terminal that is configured for physical connection with the first host apparatus 2.

The second host apparatus 3 includes a wireless communication I/F 301, a GPS antenna 302, a display 303, a processor 304, a memory 305 and a storage 306.

The wireless communication I/F 301 includes an antenna, such as a PCB pattern antenna. A frequency band in which the wireless communication I/F 301 operates is a predetermined frequency band corresponding to NFC. The GPS antenna 302 is an antenna to receive GPS signals. The display 303 displays images and information in a format which can be recognized by the user. Specifically, any of various displays such as a liquid crystal display, a plasma display, an organic EL display, and a 3-dimensional display may be used as the display 303. The processor 304 is, for example, a CPU. The processor 304 may be replaced with an ASIC (Application Specific Integrated Circuit) or programmable logic devices such as FPGA (Field Programmable Gate Array). Further, the memory 305 and the storage 306 are connected to the processor 304 through a BUS.

In one embodiment, the memory 305 is semiconductor memory. The memory 305 includes a ROM (Read Only Memory) that stores a control program of the processor 304 and a RAM (Random Access Memory) that provides a temporary operation space for the processor 304.

The processor 304 performs GPS logging operation based on the GPS signal received by the GPS antenna 302 by executing a GPS logging program or the like stored in the memory 305 or the storage 306.

The storage 306 stores GPS log information, application programs and the OS in a non-volatile manner. GPS log information includes location information for the host apparatus 3. Examples of the storage 306 include a magnetic-storage device, such as a hard disk drive, an optical storage device, a semiconductor storage device (flash memory or the like), or a combination of these devices. For example, the storage 306 stores a program for executing an image file managing application to manage image files and information related to the image files stored in the wireless memory card 1.

Figure 3A:
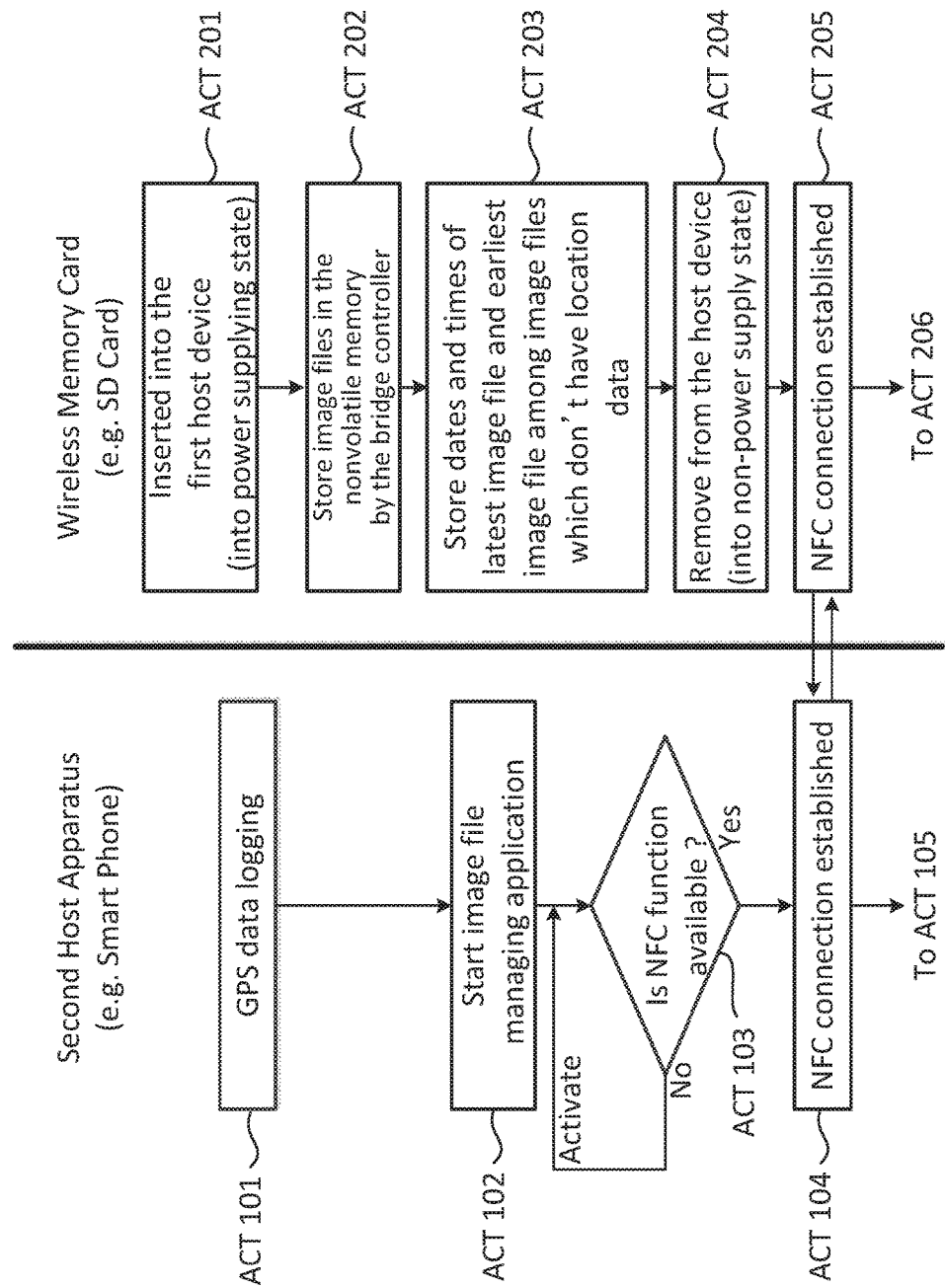
FIGS. 3A and 3B depict a flow chart of an operation according to the first embodiment.
Figure 3B:
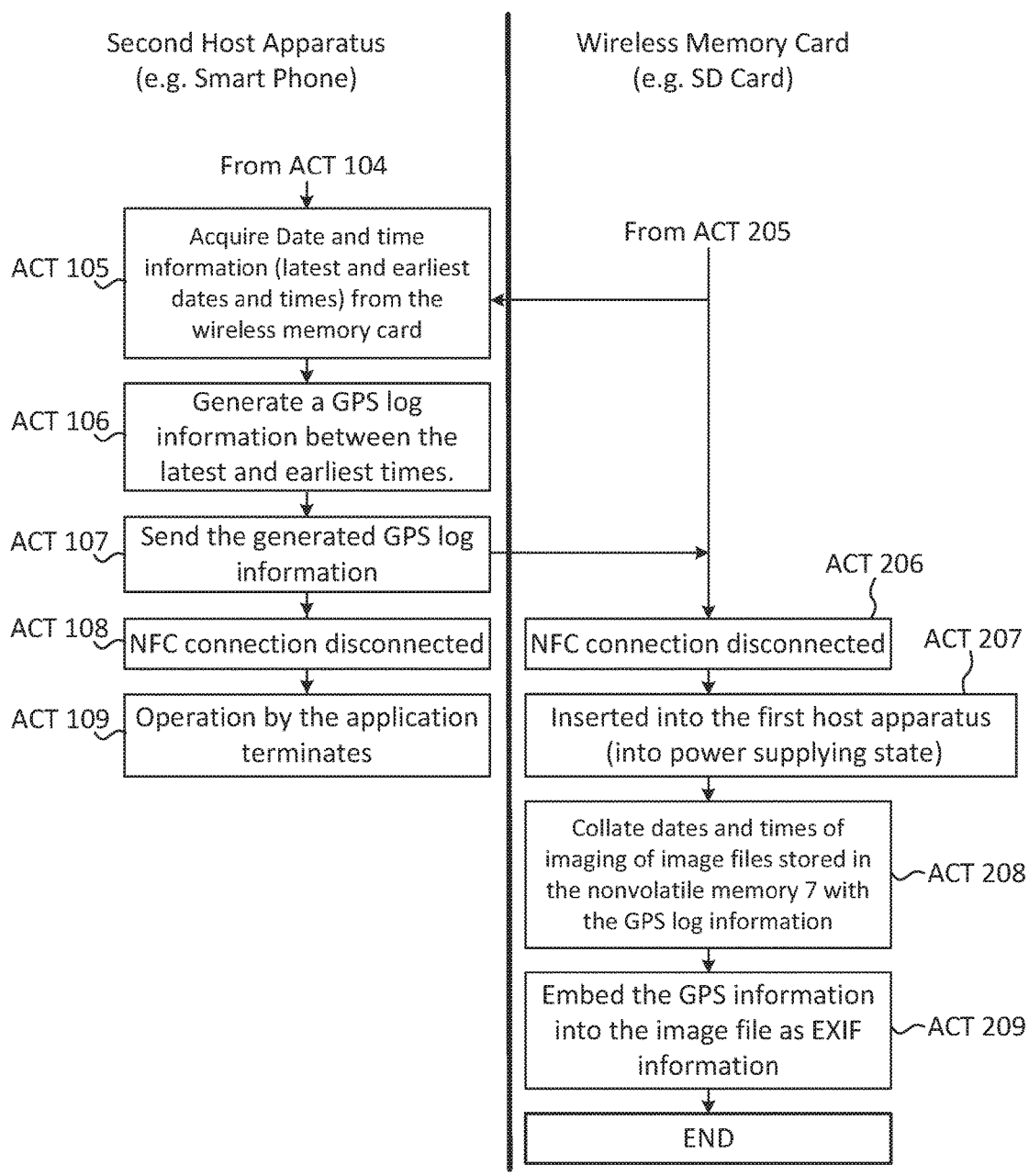

FIGS. 3A and 3B depict flow charts of an operation according to the first embodiment. In FIGS. 3A and 3B, the flow chart on the left side shows an operation executed by the second host apparatus 3, and a flow chart on the right side shows an operation executed by the wireless memory card 1.

The second host apparatus 3 collects location information using the GPS antenna 302 and stores the location information with time information in the storage 306 as GPS log information. FIG. 4 shows a table including a location information (A, B, C, D, E, . . . ) and a corresponding date and time when the location information is logged (ACT 101).

On the other hand, on the side of the wireless memory card 1, the wireless memory card 1 is inserted into the slot of the first host apparatus 2 (ACT 201). While the wireless memory card 1 is inserted into the slot of the first host apparatus 2, the first host apparatus 2 captures images and generates image data, and commands the bridge controller 8 to store image files containing the image data in the nonvolatile memory 7 (ACT 202). In this embodiment, it is assumed that the first host apparatus 2 does not have a GPS logging function. Therefore, the image files do not have any location information which indicates a location where the image of the image file was taken.

Next, communication controller 9 collects time information (dates and times) of the latest image file and the oldest image file among image files, which are stored in the nonvolatile memory 7 and are not associated with the location information, and stores them in the wireless communication memory 12 as an image file management information (ACT 203).

ACT 204 represents the removal of the wireless memory card 1 from slot of the first host apparatus, so that location information can be obtained and stored in the wireless memory card 1 for later association with the image files stored in the wireless memory card 1.

If an image file managing application installed in the second host apparatus 3 is launched (ACT 102), and the processor 304 confirms that the NFC function is available in the second host apparatus 3 (ACT 103), an NFC connection is established between the wireless memory card 1 and the second host apparatus 3 (ACT 104 and ACT 205). If the NFC function is not available, the processor 304 activates the NFC function (ACT 103, NO)

Subsequently, by way of NFC communication, the processor 304 acquires date and time information (latest and earliest dates and times) from the wireless memory card 1 (ACT 105).

The processor 304 retrieves from the GPS log information all entries that have time stamps that are between the latest and earliest times acquired from the wireless memory card 1 (ACT 106) and sends back the retrieved entries to the wireless memory card 1 (ACT 107). In response thereto, the communication controller 9 stores all retrieved GPS log entries in the wireless communication memory 12. When the retrieved GPS log information exceeds an available capacity of the wireless communication memory 12, the processor 304 may send back the retrieved entries separately based on the available capacity.

The disconnection of NFC communication between the wireless memory card 1 and the second host apparatus 3 is represented by ACT 108 and ACT 206. Thereafter, the image file managing application terminates (ACT 109).

When, after the NFC communication is disconnected, the wireless memory card 1 is inserted into the slot of the second host apparatus 3 (ACT 207), the bridge controller 8 collates dates and times of imaging of image files stored in the nonvolatile memory 7 with the retrieved GPS log entries sent from the second host apparatus 3 (ACT 208).

Figure 5:
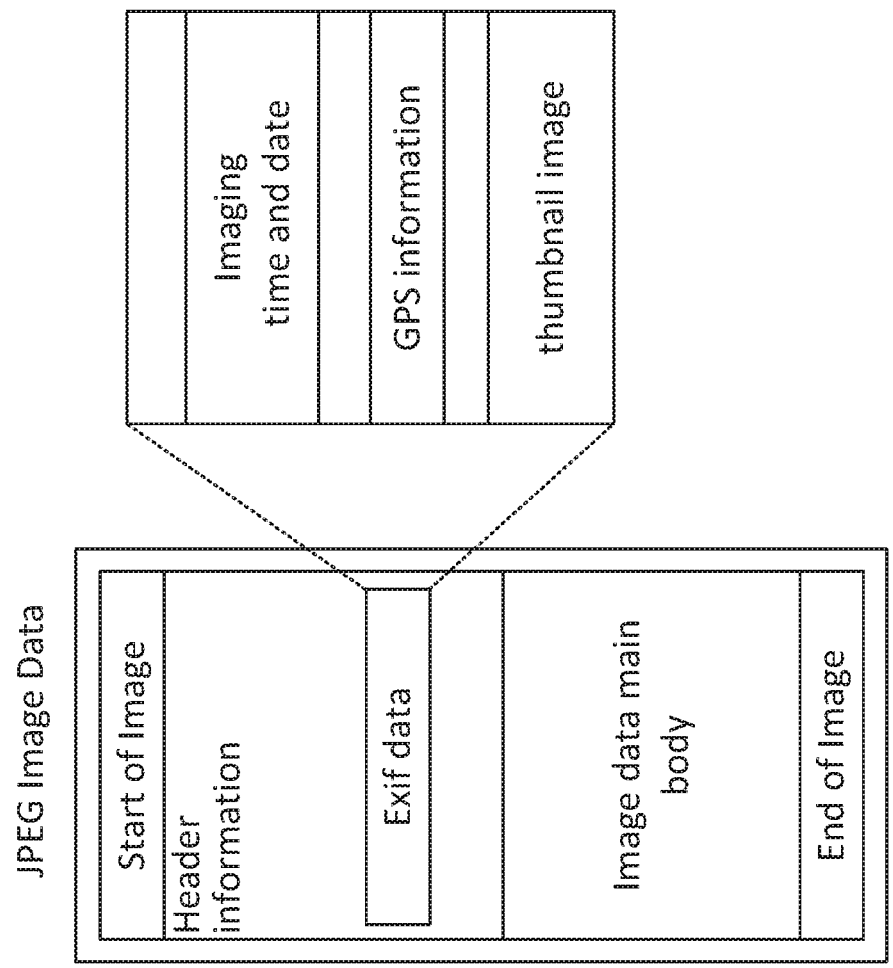
FIG. 5 is a schematic diagram depicting a basic structure of a JPG image file as an example.

Finally, the bridge controller 8 embeds the location information included in the GPS information into the corresponding image file as an EXIF information (ACT 209). FIG. 5 is a schematic diagram depicting a basic structure of a JPG image file as an example.

FIG. 6 depicts a flow chart of a detailed operation of ACTs 208 and 209 in FIG. 3B.

After the ACT 207, the bridge controller 8 searches the image files stored in the nonvolatile memory 7 (ACT 301).

If all of the image files stored in the nonvolatile memory 7 are already associated with the location information (ACT 302, NO), the operation of this flow chart ends.

On the other hand, if at least one of the image files stored in the nonvolatile memory 7 are not yet associated with the location information (ACT 302, YES), the bridge controller 8 shifts to ACT 303.

If there is an image file which has not been collated (ACT 303, YES), the bridge controller 8 acquires (1) ID of the image file(s) which has not been collated and (2) Date and time of capturing the image in the image file (referred to herein a "time stamp") included in the image file (ACT 304).

Based on the acquired information, the bridge controller 8 determines whether the GPS log includes any location information corresponding to the date and time of imaging of the acquired image file (ACT 305). If a time difference between the first time stamp included in the image file and the second time stamp corresponding to the received location information that is closest to the first time stamp is longer than a predetermined time, the bridge controller 8 determines that there is no location information should be embedded in the image file.

If the GPS log includes the location information corresponding to the date and time of imaging of the acquired image file (ACT 305, YES), the bridge controller 8 instructs the memory controller 10 to embed the location data of GPS log into the Exif data of the acquired image file stored in the nonvolatile memory 7 as shown in FIG. 5 (ACT 306) and instructs the communication controller 9 to register the image file as a collated file in the wireless communication memory 12 (ACT 307).

If the GPS log does not include the location information corresponding to the date and time of imaging of the acquired image file (ACT 305, NO), the bridge controller 8 shifts to ACT 307 and register the image file merely as a collated file. That is, if the retrieved GPS log entries do not include location information corresponding to a time stamp which is the same as or close to a time stamp of any one of the acquired image file, such image file is registered as a collated file, however the image file does not have any location information (blank).

Returning to ACT 303, if there is not an image file which has not been collated (ACT 303, NO), the bridge controller 8 stores the latest of the time stamps included in the image files that have been collated in the wireless communication memory 12 as a time stamp indicating a start point of the next collating process which will be performed when the memory card 1 is inserted into the slot of the first host apparatus 2 next time (ACT 308).

Finally, the bridge controller 8 deletes the following information (1)-(3) stored in the wireless communication memory 12 by the operation of ACT 107 and ACT 203 (ACT 309):

(1) Latest date and time;
(2) Earliest date and time;
(3) GPS log information.

In detail, the information (1) and (2) define a time range of the image files which are not associated with the location information. The GPS log information is acquired from the second host apparatus 3.

A method of linking location information to image data according to a second embodiment of the present invention is explained with reference to FIGS. 7A to 12.

In the following description of the second embodiment, components having functions same as those explained in the first embodiment are denoted by the same reference numerals and signs, and explanation of such components is repeated as needed.

Figure 7A:
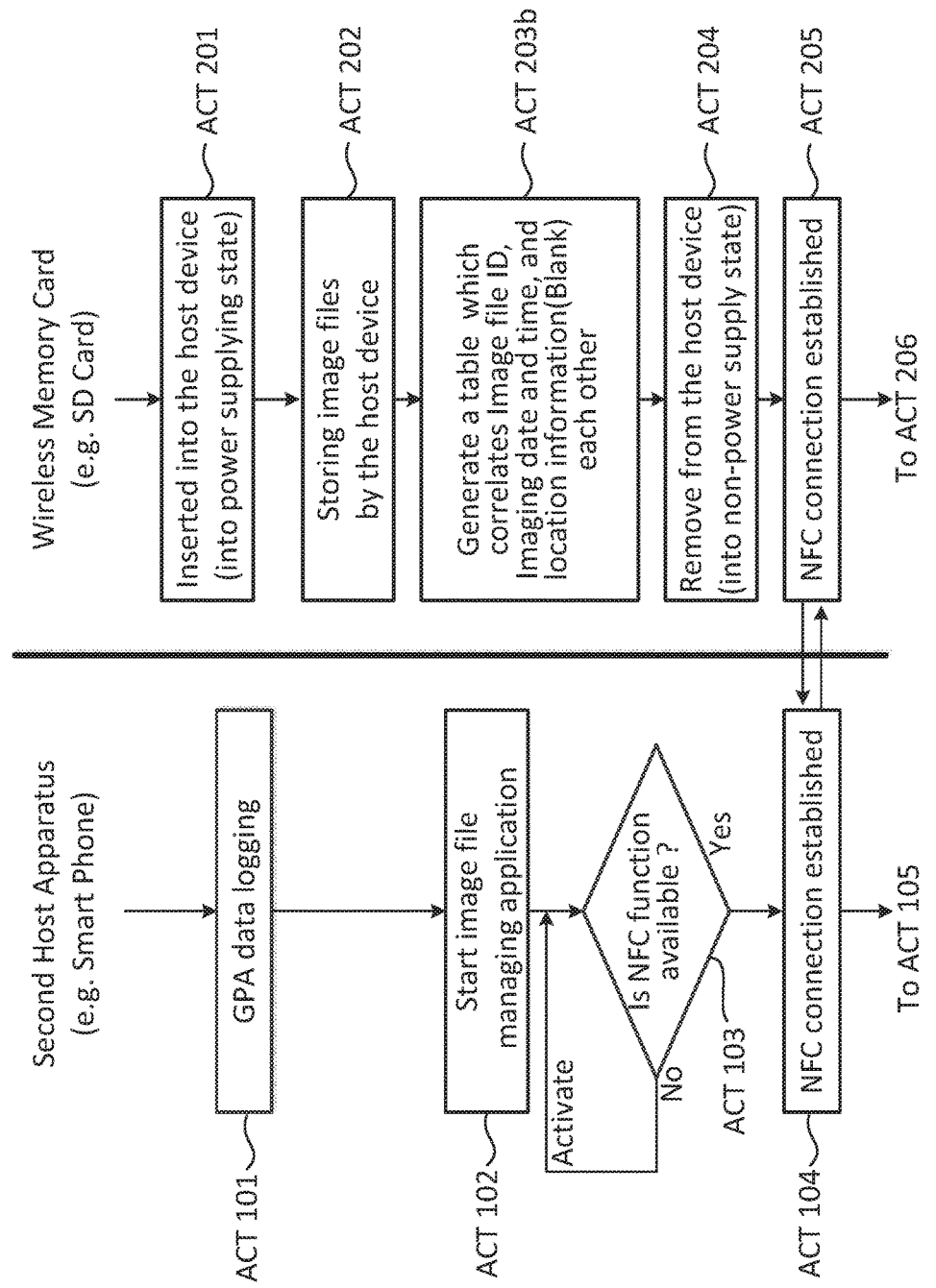
FIGS. 7A and 7B depict a flow chart of an operation according to a second embodiment.
Figure 7B:
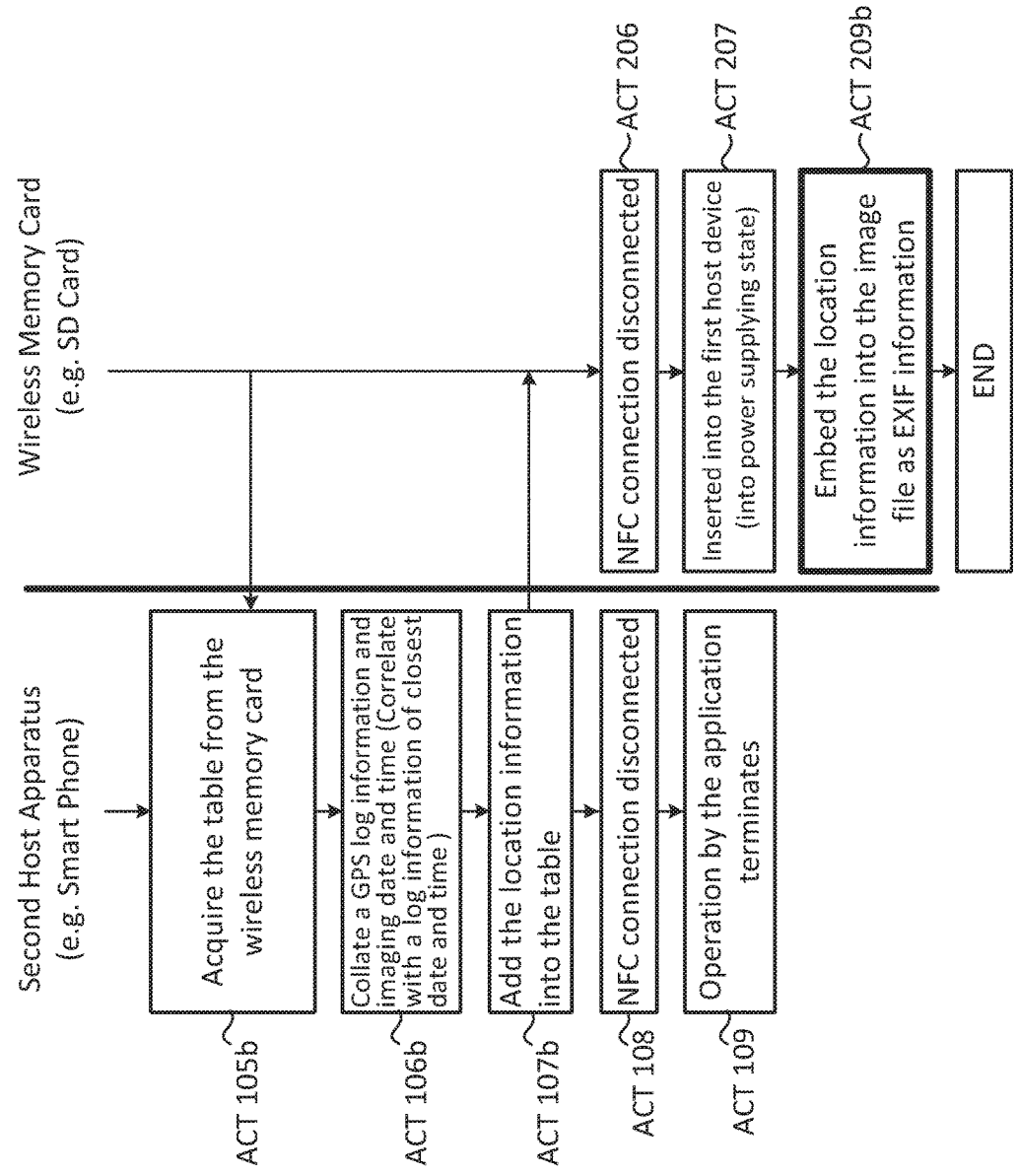

FIGS. 7A, 7B, 9 and 10 depict a flow chart of an operation according to a second embodiment. In FIGS. 7A and 7B, the flow chart on the left side shows an operation executed by the second host apparatus 3, and a flow chart on the right side shows an operation executed by the wireless memory card 1.

The second host apparatus 3 collects location information using the GPS antenna 302 and stores the location information with time information in the storage 306 as GPS log information. FIG. 4 shows a table including a location information (A, B, C, D, E, . . . ) and a corresponding date and time when the location information is logged (ACT 101).

On the other hand, on the side of the wireless memory card 1, the wireless memory card 1 is inserted into the slot of the first host apparatus 2 (ACT 201). While the wireless memory card 1 is inserted into the slot of the first host apparatus 2, the first host apparatus 2 captures images and generates image data, and commands the bridge controller 8 to store image files containing the image data in the nonvolatile memory 7 (ACT 202). In this embodiment, it is assumed that the first host apparatus 2 does not have GPS logging function. Therefore, the image files do not have any location information which indicates a location where the image of the image file was taken.

Next, the bridge controller 8 generates a table which correlates (1) Image file ID, (2) Imaging date and time, and (3) location information (Blank) each other (ACT 203*b*).

FIG. 8 is a table generated by the bridge controller 8 showing the image file management information without the location information stored in the wireless communication memory 12. In the table of FIG. 8, ID of the image file, date and time when the image of the image file is imaged, and the location information (blank) are associated with each other.

ACT 204 represents the removal of the wireless memory card 1 from slot of the first host apparatus 2, so that location information can be obtained and stored in the wireless memory card 1 for later association with the image files stored in the wireless memory card 1.

If an image file managing application installed in the second host apparatus 3 is launched (ACT 102), and the processor 304 confirms that the NFC function is available in the second host apparatus 3 (ACT 103), an NFC connection is established between the wireless memory card 1 and the second host apparatus 3 (ACT 104 and ACT 205).

If the NFC function is not available, the processor 304 activates the NFC function (ACT 103, NO).

Subsequently, by way of NFC communication, the processor 304 acquires the table generated by the bridge controller 8 (FIG. 8) from the wireless memory card 1 (ACT 105*b*).

The processor 304 collates the GPS log information with the imaging date and time of the image file. Specifically, the processor 304 associates the timing of logging of the GPS log information with the closest timing of the imaging of the image of the image file (ACT 106*b*).

Based on the collation, the processor 304 adds the location information into the table stored in the wireless communication memory 12 (ACT 107*b*), and sends back the table to the wireless memory card 1. In ACT 107*b*, the processor 304 may send back only the location information which should be added to the table to the wireless memory card 1, and the bridge controller 8 may overwrite the acquired location information in the table.

The disconnection of NFC communication between the wireless memory card 1 and the second host apparatus 3 is represented by ACT 108 and ACT 206. Thereafter, and the operation executed by the image file managing application terminates (ACT 109).

When, after the NFC communication is disconnected, the wireless memory card 1 is inserted into the slot of the second host apparatus 3 (ACT 207), the bridge controller 8 embeds the location information included in the retrieved GPS log entries into the corresponding image file as an EXIF information (ACT 209b). FIG. 5 is a schematic diagram depicting a basic structure of a JPG image file as an example.

Figure 9:
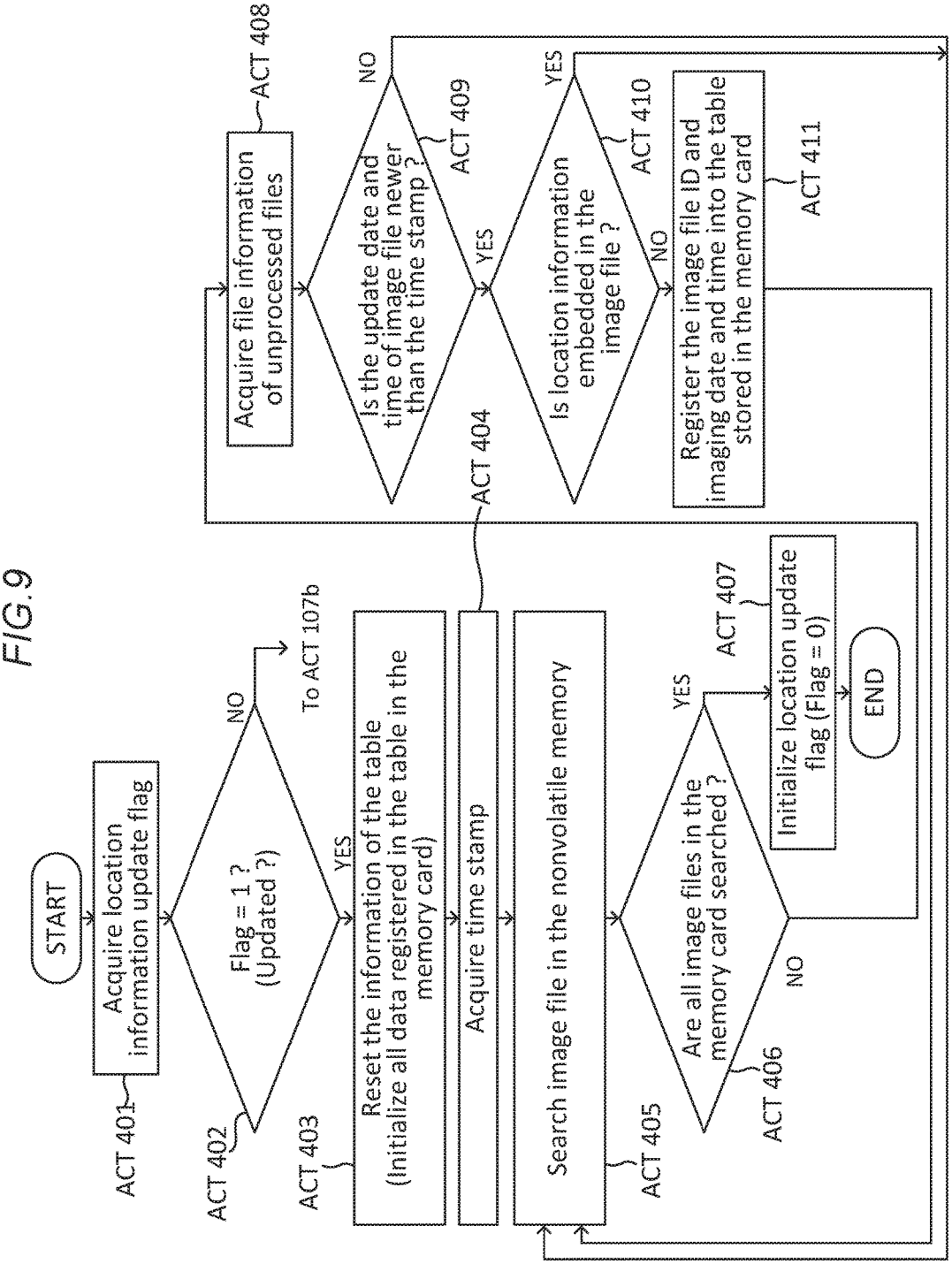
FIGS. 9, 10, and 12 depict a flow chart of a detailed operation of steps in FIGS. 7A and 7B.

FIG. 9 depicts a flow chart of a detailed operation of ACT 203b in FIG. 7A.

After the operation of ACT 202, the bridge controller 8 acquires a location information update flag from the wireless communication memory 12 (ACT 401).

If the number of the acquired flag is not "1" (ACT 402, NO), the bridge controller 8 shifts to ACT 107b.

On the other hand, if the value of the acquired flag is "1" (ACT 402, YES), the bridge controller 8 initialize all data registered in the table stored in the wireless communication memory 12 (ACT 403).

After ACT 403, the bridge controller 8 acquires a time stamp (ACT 404). Here, the time stamp is a latest timing of the imaging of an image file to which the location information is added in the last operation of ACT 107b.

The bridge controller 8 searches image files in the nonvolatile memory 7 (ACT 405).

When all image files stored in the nonvolatile memory 7 are searched (ACT 406, YES), the bridge controller 8 initializes a location update flag (ACT 407). After the initialization by the bridge controller 8, the operation ends.

On the other hand, if all image files stored in the nonvolatile memory 7 have not been searched yet (ACT 406, NO), the bridge controller 8 acquires file information of the unprocessed files (ACT 408).

If the update timing of the image file is not newer than the stored time stamp (ACT 409, NO) or the location information is embedded into the image file (ACT 410, YES), the bridge controller 8 goes back to ACT 405 again.

On the other hand, if the update timing of the image file is newer than the stored time stamp (ACT 409, YES) and the location information is not embedded into the image file (ACT 410, NO), the bridge controller 8 registers the image file ID and imaging timing (date and time) into the table stored in the wireless communication memory 12 (ACT 411).

Figure 10:
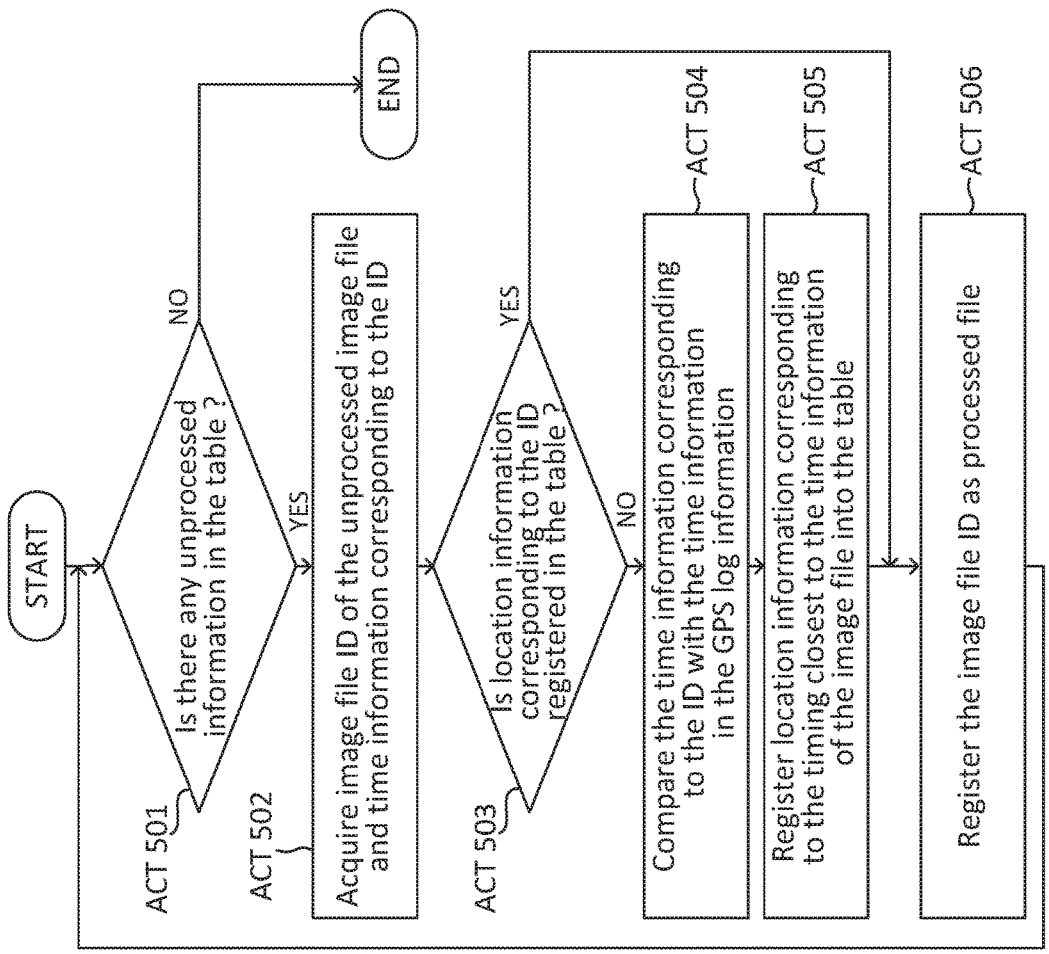

FIG. 10 depicts a flow chart of a detailed operation of ACTs 106b and 107b in FIG. 7B.

After the operation of ACT 105, the processor 304 determines whether there are any unprocessed information in the table stored in the wireless communication memory 12 (ACT 501).

If there are no unprocessed information in the table stored in the wireless communication memory 12 (ACT 501, NO), the operation ends.

On the other hand, if there are unprocessed information in the table stored in the wireless communication memory 12 (ACT 501, YES), the processor 304 acquires the file ID of the unprocessed image file and time information corresponding to the ID (ACT 502).

If the location information corresponding to the ID is already registered in the table stored in the wireless communication memory 12 (ACT 503, YES), the processor 304 registers the image file ID as the ID of the processed file (ACT 506).

On the other hand, if the location information corresponding to the ID has not been registered yet in the table stored in the wireless communication memory 12 (ACT 503, NO), the processor 304 compares the time information corresponding to the file ID with the time information of the GPS log information (ACT 504). FIG. 11 is a diagram depicting an associating process between the image file without the location information and the GPS log information according to the second embodiment.

Subsequently, the processor 304 registers location information corresponding to the timing closest to the time information of the image file in the table stored in the wireless communication memory 12 (ACT 505) and then the processor 304 shifts to ACT 506.

Figure 12:
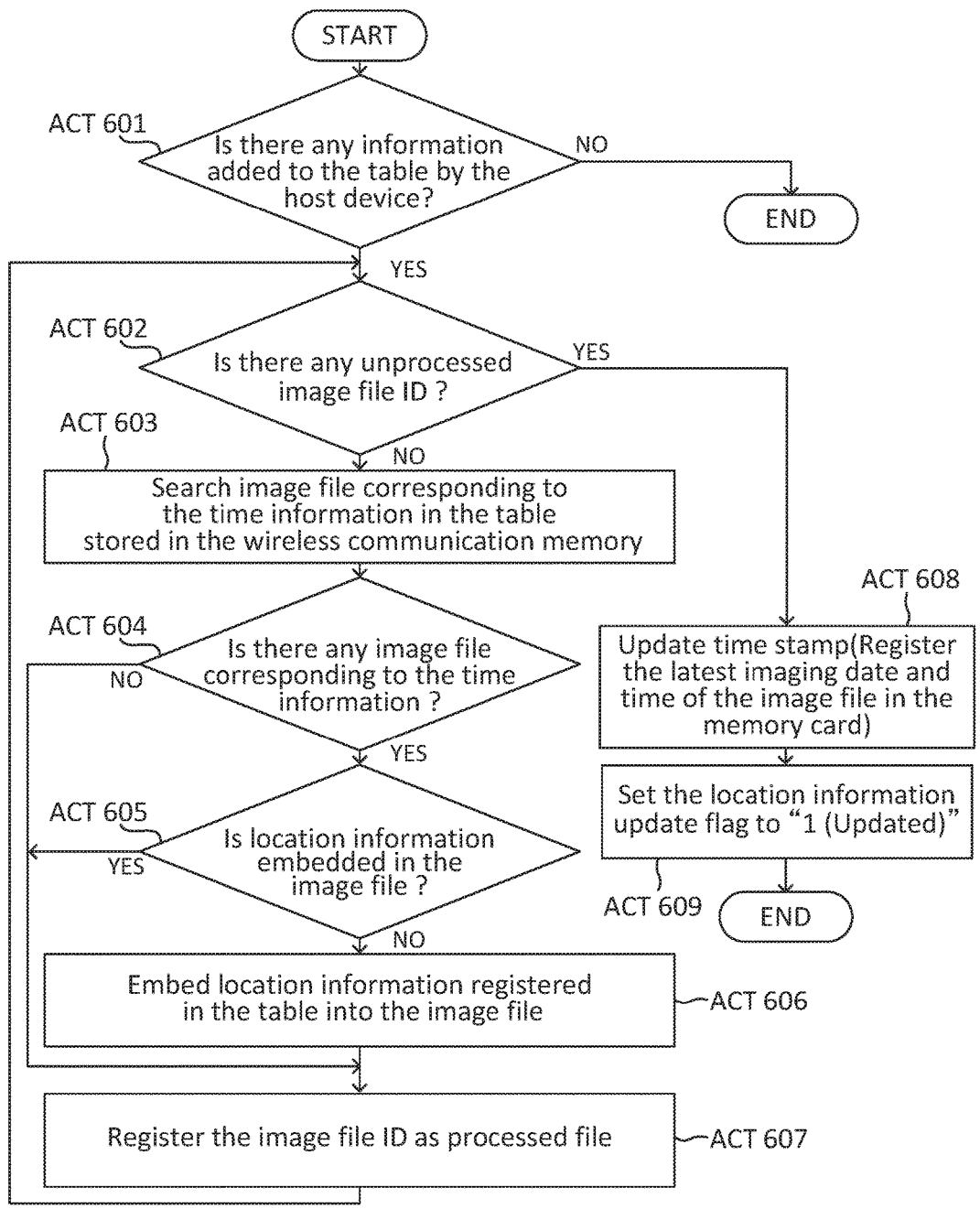

FIG. 12 depicts a flow chart of a detailed operation of ACT 209b in FIG. 7B. First, the bridge controller 8 determines whether information has been added to the table by the host device (ACT 601).

If there is no information added to the table by the host device (ACT 601, NO), the operation ends. On the other hand, if there is an information added to the table by the host device (ACT 601, YES), the bridge controller 8 confirms whether there is any unprocessed image file ID (ACT 602).

If there is unprocessed image file ID (ACT 602, YES), the bridge controller 8 registers the latest imaging date and time of the image file in the nonvolatile memory 7 to update the time stamp (ACT 608) and sets the location information update flag to "1 (Updated)" (ACT 609).

Further, if there is no unprocessed image file ID (ACT 602, NO), the bridge controller 8 searches image file corresponding to the time information in the table stored in the wireless communication memory 12 (ACT 603).

Next, if there is an image file corresponding to the time information (ACT 604, YES) and the location information has not been embedded in the image file (ACT 605, NO), the bridge controller 8 embeds the location information registered in the table into the image file (ACT 606) and register the image file ID as the ID of the processed file (ACT 607).

On the other hand, if there is no image file corresponding to the time information (ACT 604, NO) or the location information has already been embedded in the image file (ACT 605, YES), the bridge controller 8 directly shifts to ACT 607.

In the above embodiments, it is possible to select any data format of the time stamps. For example, the time stamp may be defined with respective to absolute time (e.g. year/month/day/hour/minute/second). Further, in the above embodiments, it is also possible to select other parametric information to be included in the time stamps to collate the image files, According to the embodiments, even when the imaging devices that don't have the GPS logging functions, the user does not need to manually and independently associate corresponding location information with the image data after the imaging by the imaging devices, in order to manage the image files based on the location information.

Embodiments can be carried out in various forms without departing from main characteristics thereof. The embodiments are merely exemplars in every aspect and should not be limitedly interpreted. The scope of the present invention is indicated by the scope of claims. The text of the specification does not restrict the scope of the invention. All variations and various improvements, alterations, and modifications belonging to the scope of equivalents of the scope of claims are within the scope of the present invention.

What is claimed is:

1. A method of adding location information to image data in a wireless storage device having an antenna, comprising:
generating image files with an imaging apparatus in which the wireless storage device is installed and storing the image files in the wireless storage device, each of the image files including image data of a captured image and a time stamp of when the image was captured;
determining by the wireless storage device, a first time stamp and a second time stamp within a group of the image files stored in the wireless storage device;
establishing a wireless communication between the wireless storage device that has been removed from the imaging apparatus and a device having a location logging function;
wirelessly transmitting the first time stamp and the second time stamp from the wireless storage device to the device having the location logging function using power induced by radio waves received through the antenna from the device having the location logging function and, in response to the wirelessly transmitting, wirelessly receiving at the wireless storage device, location information corresponding to at least one of a plurality of time stamps including the first time stamp, the second time stamp, and a third time stamp that is between the first time stamp and the second time stamp; and
embedding location information in each of the image files stored in the wireless storage device, based on the time stamp included therein and the location information received from the device.

2. The method of claim 1, wherein the first time stamp is an earliest time stamp, and the second time stamp is a latest time stamp.

3. The method of claim 1, wherein
if the location information includes a first location information corresponding to the first time stamp and a second location information corresponding to the second time stamp, the location information embedded in a first image file that has the first time stamp is the first location information and the location information embedded in a second image file that has the second time stamp is the second location information.

4. The method of claim 3, wherein
if the location information includes a third location information corresponding to the third time stamp, the location information embedded in a third image file that has the third time stamp is the third location information.

5. The method of claim 1, wherein
if an image file includes a time stamp that does not match any of the time stamps corresponding to the received location information, the location information corresponding to one of the time stamps corresponding to the received location information that is closest to the time stamp is included in the image file.

6. The method of claim 1, wherein the location information is embedded in each image file after the wireless storage device is re-installed in the imaging apparatus using power supplied from the imaging apparatus.

7. The method of claim 1, further comprising:
searching for a time stamp which is closest in time to the time stamp of an image file among the time stamps corresponding to the received location information, using power supplied from the imaging apparatus after the wireless storage device has been re-installed in the imaging apparatus.

8. A wireless storage device comprising:
an antenna;
a first nonvolatile memory in which a group of image files, each including image data of a captured image and a time stamp of when the image was captured, are stored;
a second nonvolatile memory in which a first time stamp and a second time stamp of the image files in the group are stored; and
a controller including a first controller configured to perform wireless communication with a host device having a location logging function through the antenna to transmit the first time stamp and the second time stamp to the host device having the location logging function, and in response thereto, receive location information corresponding to at least one of a plurality of time stamps including the first time stamp, the second time stamp, and a third time stamp that is between the first time stamp and the second time stamp, and a second controller configured to embed location information in each of the image files stored in the first nonvolatile memory, based on the time stamp included therein and the location information received from the host device, wherein
the first controller and the second nonvolatile memory are operable using power induced in the antenna, and the second controller and the first nonvolatile memory are not operable using the induced power.

9. The device of claim 8, wherein
the first controller determines the first time stamp and the second time stamp from the image files that do not have the location information embedded therein.

10. The device of claim 9, wherein
the first controller deletes the location information, the first time stamp, and the second time stamp after the location information is embedded in the image files.

11. The device of claim 8, wherein
if an image file includes a time stamp that does not match any of the time stamps corresponding to the received location information, the controller embeds the location information corresponding to one of the time stamps corresponding to the received location information that is closest to the time stamp is included in the image file.

12. The device of claim 11, wherein
if a time difference between a first time stamp included in the image file and a second time stamp corresponding to the received location information that is closest to the first time stamp is longer than a predetermined time, the controller determines that there is no location information should be embedded in the image file.

* * * * *